United States Patent [19]
Chapman, Jr.

[11] 3,769,747
[45] Nov. 6, 1973

[54] COVERING FOR A SEED OR PLANT BED
[75] Inventor: George Chapman, Jr., Ridgewood, N.J.
[73] Assignee: Johnson & Johnson, New Brunswick, N.J.
[22] Filed: Oct. 18, 1971
[21] Appl. No.: 190,016

[52] U.S. Cl. .................... 47/31, 47/9, 160/DIG. 7
[51] Int. Cl. ............................................ A01g 13/04
[58] Field of Search .................. 47/31, 26, 21, 9, 47/56

[56] References Cited
UNITED STATES PATENTS

| 3,482,609 | 12/1969 | Neckerman | 47/31 X |
| 2,830,404 | 4/1958 | Manning | 47/21 |
| 3,557,491 | 1/1971 | Franklin et al. | 47/56 |
| 2,192,939 | 3/1940 | Slayter et al. | 47/9 X |
| 2,687,363 | 8/1954 | Manning | 47/9 X |
| 3,299,567 | 1/1967 | Perkins | 47/9 |

Primary Examiner—Robert E. Bagwill
Attorney—Alexander T. Kardos et al.

[57] ABSTRACT

A light weight, substantially rectangular covering for a seed or plant bed comprising: a flat, substantially planar body portion formed of a nonwoven reticulated filamentary structure of overlapping, intersecting continuous synthetic organic thermoplastic filaments bonded to each other at a multiplicity of irregularly spaced points along their lengths, the continuous filaments being disposed in random, intermingled configurations uniformly distributed throughout the structure without a pattern of parallelism between the continous filaments so that no two parts of the structure are identical reinforcing edge portions on both sides and both ends of the seed or plant bed covering; reinforcing strips of synthetic organic thermoplastic material positioned within the reinforcing edge portions of the nonwoven reticulated filamentary structure; and a plurality of openings formed at spaced intervals in the reinforcing edge portions and the reinforcing strips for use with fastening devices whereby the covering may be secured in place over the seed or plant bed during use.

11 Claims, 4 Drawing Figures

PATENTED NOV 6 1973  3,769,747

COVERING FOR A SEED OR PLANT BED

FIELD OF THE INVENTION

Various types of relatively open mesh fabricated materials have been used by farmers, nurserymen, plant growers, and the like, to cover and protect seed or plant beds during their early growth from the ravaging effects of late frosts or early high temperatures, or the washing away and erosive effect of rain and wind, and similar destructive influences.

The physical and structural requirements for such relatively open mesh fabricated materials, more commonly known as seen or plant bed coverings, or "tobacco canvas" or sometimes simply "canvas" or cheesecloth, have therefore been many.

Temperature control is probably one of the most important of these properties. It is imperative that the temperature of the soil surface and the seed or plants be maintained within certain limits so that proper and rapid early growth can be insured. Too high or too low a temperature can easily kill the seed or plant, or at least can slow down the growth thereof as to prevent desirably early growth or the attaining of the high percentage of satisfactory transplants.

Rain and wind protection is also an important property in order to prevent undesirable leaching, or washing out of the seed or plants, or the undesirable erosion of the soil surface from around the seed or plants.

Openness and porosity of the seed or plant bed cover is similarly important in order to provide proper penetration of water, or other fluid or air spray materials, such as pesticides, germicides, fungicides, disinfectants, fumigants, etc., directly without the relatively open mesh seed or plant bed cover without necessitating its time-consuming removal from the seed or plant bed.

A correlative of the openness or porosity properties is the ability of the seed or plant bed cover to protect the seed or the tender shoots and foliage from marauding birds and small animals.

A further desirable property is the ability of the seed or plant bed cover to resist deterioration from rot, mildew, and other decay due to the effect of water, soil, etc.

BRIEF SUMMARY OF THE INVENTION

It has been discovered that these requirements can be met by making a light weight, substantially rectangular covering comprising a flat substantially planar body portion formed of a nonwoven reticulated filamentary structure of continuous synthetic organic thermoplastic filaments bonded to each other at a multiplicity of irregularly spaced points along their lengths, the continuous filaments being disposed in random, intermingled configurations uniformly distributed throughout the structure without a pattern of parallelism between the filaments so that no two parts of the structure are identical, forming reinforcing edge portions on both sides and both ends of the covering by positioning reinforcing strips of synthetic organic thermoplastic material adjacent the edges of the nonwoven reticulated filamentary structure, then edge-folding and forming at least one folded layer of the nonwoven reticulated filamentary structure around the reinforcing strips of synthetic organic thermoplastic material, bonding the folded layers and reinforcing strips, and forming a plurality of openings at spaced intervals in the folded edges and the reinforcing strips for use with fastening devices whereby the covering may be secured in place over the seed or plant bed during use.

In the following specification and accompanying drawings, there are described and illustrated preferred embodiments of the invention but it is to be understood that the inventive concept is not be to considered limited to the embodiments disclosed, except as determined by the scope of the appended claims.

BRIEF DESCRIPTION OF THE DRAWINGS

Referring to the accompanying drawings.

DESCRIPTION OF THE PREFERRED EMBODIMENT

Figure 1:
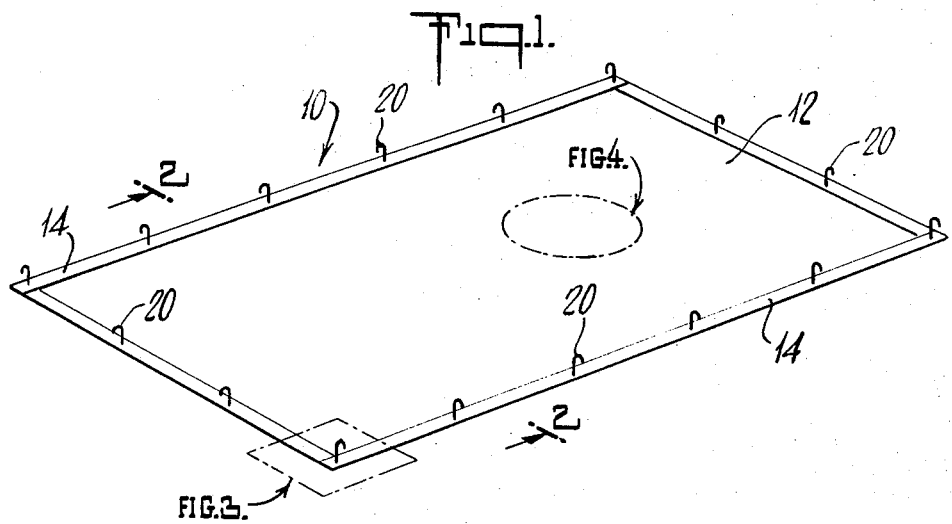
FIG. 1 is a perspective view of a typical seed or plant bed cover of the present inventive concept.
Figure 2:
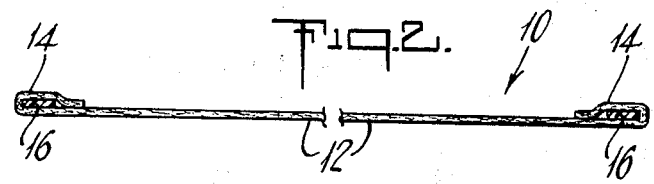
FIG. 2 is a cross-sectional view of the seed or plant bed cover of FIG. 1, taken on the line 2—2 thereof, in the direction indicated by the arrows.
Figure 3:
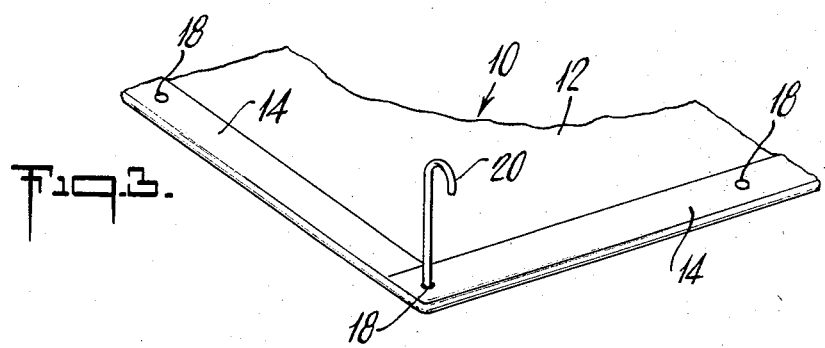
FIG. 3 is a detail drawing of one corner of the seed or plant bed cover of FIG. 1 but shown in much larger magnified scale and FIG. 4 is a detail drawing showing the nonwoven reticulated filamentary structure in much larger magnified scale.

Referring to FIG. 1 of the drawings in detail, there is shown a substantially rectangular seed or plant bed cover 10 comprising a centrally located body portion 12, a folded reinforcing edge portion 14 at both sides and both ends of the body portion 12, a reinforcing strip 16 (see FIG. 2) positioned within the folded reinforcing edge portion 14, and openings 18 (see FIG. 3) formed in the folded reinforcing edge portion 14 and reinforcing strip 16.

Figure 4:
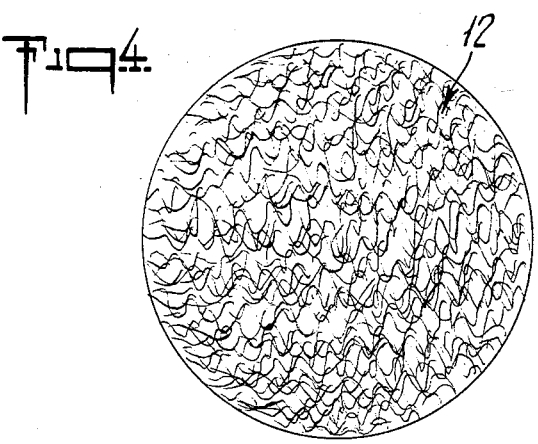

The body portion 12 of the seed or plant bed cover 10 is flat and substantially planar and comprises a nonwoven reticulated filamentary structure of continuous synthetic organic thermoplastic filaments bonded to each other at a multiplicity of irregularly spaced points along their lengths, the continuous filaments being disposed in random, intermingled configurations, uniformly distributed throughout the body portion 12 without any predetermined pattern of parallelism between the individual filaments so that no two parts of the body portion are identical. FIG. 4 discloses such a filamentary configuration. Such a structure is highly porous and pervious and highly flexible, and the individual continuous filaments thereof are highly and randomly curled and intermingled, and bonded to each other at a plurality of irregularly spaced points along their length. The entire surface of the structure is completely nonuniform insofar as individual small unit areas are concerned but, when considered in an overall fashion, the structure is relatively uniform and homogeneous, insofar as overall, general physical and chemical properties and characteristics are concerned.

The synthetic organic thermoplastic filaments are preferably made of nylon polyamide 6/6 (polyhexamethylene adipamide), although other nylon polyamides, notably 6 (caprolactam type) are of use. Also of use are other synthetic organic thermoplastic filaments such as polyesters (notably polyethylene terephthalate), polyolefins (notably polyethylene and polypropylene), polyacrylics, polyurethanes, polycarbonates, polyacetals, etc. Mixtures of these continuous filaments in various blends and proportions are of use.

The average denier of the individual filaments varies widely and the average denier is generally in a range of from about 1 denier to about 5 denier. Smaller denier down to about one-half denier, or larger denier up to about 7 denier, or 10 denier, or even more are suitable in special cases.

Normally, all the filaments in a particular seed or plant bed covering will have the same average denier, that is, that will all be about 4 denier, or about 8 denier, etc. However, in special cases intended for special purposes, mixtures of continuous filaments of different denier may be used.

The weight of the seed or plant bed cover also varies widely and may be as low as about 0.3 ounces per square yard and may range up to as high as about 6 ounces per square yard, or even more, for special uses. Preferred ranges extend from about 0.6 ounces per square yard to about 2 ounces per square yard.

There are several methods known in the prior art for making such randomly formed nonwoven reticulated filamentary structures. One typical well-known method is illustrated and described in U.S. Pat. No. 3368934 which issued Feb. 13, 1968 and in British Pat. No. 932,482 which was published July 31, 1963 and reference thereto is incorporated herein. Such randomly formed nonwoven reticulated structures are often referred to in the industry as "spun-bonded" fabrics.

Other well-known methods for making such randomly formed nonwoven reticulated filamentary structure are noted in Canadian Pat. No. 1,242,000 which was published Aug. 11, 1971 and U. S. Pat. No. 3,595,731 which issued July 27, 1971.

These patents disclose somewhat related randomly formed nonwoven reticulated filamentary structures but differ from each other basically in the methods and apparatus used for obtaining such structures.

The randomly formed nonwoven reticulated filamentary structures, however, are generally comparable and similar. They are usually made by deposition of the continuous filaments in freshly spun condition on a moving belt or conveyor. If they are still somewhat soft and tacky when they are so deposited, they will autogeneously bond to each other wherever they intersect, overlap, or cross over each other. If they do not sufficiently adhere or bond to each other, heat and/or pressure and/or solvents may be used to augment the initial bonding of the continuous filaments. Stretching or attentuation of the filaments are employed during their spinning to molecularly orient and strengthen them. This, of course, also accelerates the delivery of the filaments from the extruder to the moving carrier or receiver. Electrostatic, pneumatic, hydraulic, or other forces may be employed to separate and open up the individual filaments, prior to or during their deposition on the carrier.

The reinforcing edge portions 14 which extend on both sides and both ends of the nonwoven reticulated filamentary structure are normally made by simply positioning a relatively narrow strip 16 of a suitable synthetic organic thermoplastic material on the nonwoven reticulated filamentary structure parallel to the edge thereof (see FIG. 2) and simply folding the extra portion of nonwoven reticulated filamentary material up and over the top of the strip 16 to cover the same. The strip 16 is thus sandwiched between two layers of the nonwoven reticulated filamentary structure. Heat and/or pressure may then be applied to the sandwich for a sufficient period of time to bond the three layers into a unitary, strong, reinfocing edge portion 14, as shown.

The heat and/or pressure may be applied by means of a heated pressure roller, or other heat pressure device, or the fusing and sealing of the thermoplastic nonwoven reticulated filamentary structure and the thermoplastic reinforcing strip may be accomplished by means of an ultrasonic sewing machine or equivalent apparatus.

The reinforcing strip 16 is selected from the same group of synthetic organic thermoplastic materials described previously in connection with the materials used in making the nonwoven reticulated filamentary structure.

The thickness of the reinforcing strip 16 varies widely and is in the range of from about 1 mil to about 6 mils, although heavier weights to 10 mils or more are of use in special circumstances.

The width of the reinforcing strip 16 and the overlapped portion of the nonwoven reticulated filamentary structure is in the range of from about three-eighths inch to about 1-½ inches. Narrower or wider strips and overlapped portions may be used, as desired or required.

A plurality of slits or openings 18 is then formed in the reinforcing edge portion 14. This may be done in many ways such as by punching openings therein, or by the use of a heated die which melts through the thermoplastic structure and the thermoplastic strip and forms the size opening desired or required. Ultrasonic apparatus may also be used to form the desired openings. Such openings are, of course, intended for use with metallic or plastic fastening devices or pins 20 which are inserted through the openings 18 into the ground of framework to hold the seed or plant bed cover in place during use. The openings are preferably equidistantly spaced and range from about 6 inches apart to about 18 inches apart. Spacing up to 36 inches apart is satisfactory for some uses.

In the event that additional resistance to tearing is desired in the slits or openings 18, grommets of a metallic nature, usually of brass or steel, or of a plastic nature may be inserted in the slits or openings, as desired or required.

These grommets are particularly advantageous when it is desired to join two, three, or more covers into a large extra size cover. For example, covers of a size of 9 feet × 100 feet, of 6 feet × 100 feet, or 3 feet × 100 feet, may be combined by interlacing several together by passing an interlacing cord through adjacently positioned covers to form a cover 18 feet × 100 feet, or more if so desired.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

Experiments were conducted in 1971 at three research stations under the control and supervision of North Carolina State University to evaluate the relative influence of standard and experimental seed and plant bed covers on the soil and air temperature near the soil surface and on the number and timeliness of transplants produced. The seed and plant bed covers were: two standard all-cotton cheesecloth covers referred to as 28 × 24 and 24 × 20; the invention random, intermingled reticulated filamentary nonwoven fabric, referred to as SB-06; and two polyethylene plastic covers, one solid (unperforated) and one perforated.

The soil at the experimental sites was prepared according to conventional practices, fumigated with methyl bromide about 6 to 8 weeks prior to seeding, and fertilized at the time of seeding with 12-6-6 at the rate of 64 pounds per 100 square yards. Each site was seeded with tobacco seed variety Coker 219 at the rate of one ounce per 600 square yards. Following seeding, thermocouples were located at approximately 0.5 inch above and 0.5 inch below the soil surface and connected to automatic temperature sensing equipment programmed to record on tape, soil and air temperature once each hour during the recording period. The soil surface was then covered with a thin layer of pine or wheat straw sufficient to support the seed and plant bed covers approximately one-half inch above the soil surface. The seed and plant bed covers were placed on this straw; the plastic covers were buried around the edges of the plot with soil, and the others were stabilized with wire fastening pins. A plot was 6 ft. × 6 ft.; each treatment was replicated four times.

The straw was removed when the seedlings reached a height of about one-fourth inch. An unanticipated rapid rise in the ambient temperature resulted in the development of plant lethal temperatures under the solid plastic (unperforated) plastic covers: thus no transplant data are available for this treatment. Perforated plastic covers were removed earlier than the standard and experimental covers to avoid plant lethal temperatures. Standard and experimental covers were removed when the plants reached transplant size on the earliest treatments.

The plants were pulled and counted from a one square yard area in each plot when they reached the normal size for transplanting. The frequency of pulling was about each four days and continued until the end of the normal period for transplanting tobacco in the region where the experiment was located.

The earliest detectable germination occurred under the solid plastic, but it preceded that under the SB-06 invention cover by only a short time. Until the plants under solid unperforated plastic were destroyed by high temperature, the general size of those under the SB-06 invention were somewhat smaller than under the solid unperforated plastic but substantially larger than under the 28 × 24 or 24 × 20 cheesecloth cover.

To facilitate condensing the soil and air temperature data into manageable and interpretable units, a factor referred to as "degree-hours" above and below 16° C. (approximately 60° F) was based on the assumption (supported by some evidence) that at this point, temperature variations have their greatest influence on plant growth. The numerical value for degree-hours was calculated by multiplying the value obtained from the difference between the actual temperature was 16° C. by the hours at that temperature and summing the products for each 24 hour period. Three experimental periods were selected to represent different magnitudes of day-night temperature fluctuations.

Data on degree-hours for the various covers under three temperature regimes are given in Table 1. The larger the degree-hour value above 16° C, the higher the relative temperature; and the smaller the degree-hour below 16° C, the higher the relative temperature. The air temperature near the soil surface was, as expected, highest under the solid plastic and lowest where no cover was used. The effects of the perforated cover were not consistently different from the solid plastic but where such difference occurred the temperature was lower under the perforated plastic. The air temperature under the invention SB-06 cover was frequently less than that under the plastic covers but higher than under the standard 28 × 24 cover. The general relationships of covers to soil temperature were similar to their effects on air temperature.

TABLE I

Influence of types of plant bed covers on the number of degree hours above and below 16° C. under three environmental conditions

| Cover designation | Degree hours | | | | | |
|---|---|---|---|---|---|---|
| | Above 16° C. | | | Below 16° C. | | |
| | Cond. 1 | Cond. 2 | Cond. 3 | Cond. 1 | Cond. 2 | Cond. 3 |
| | Air temperature | | | | | |
| None | 1 | 8 | 23 | 395 | 259 | 188 |
| 28 x 24 cheesecloth | 2 | 15 | 48 | 315 | 199 | 109 |
| INVENTION COVER SB-06 | 4 | 26 | 87 | 259 | 167 | 83 |
| Perforated plastic | 10 | 32 | 116 | 215 | 152 | 59 |
| Solid plastic | 14 | 36 | 138 | 210 | 151 | 66 |
| | Soil temperature | | | | | |
| None | 1 | 3 | 15 | 310 | 218 | 148 |
| 28 x 24 cheesecloth | 1 | 3 | 27 | 270 | 189 | 99 |
| INVENTION COVER SB-06 | 1 | 13 | 51 | 224 | 153 | 67 |
| Perforated plastic | 3 | 8 | 75 | 171 | 132 | 44 |
| Solid plastic | 4 | 18 | 97 | 170 | 130 | 48 |

The relative effects of covers on transplant production is given in Table 2. The number of early and number of total transplants pulled were substantially higher with the invention SB-06 cover than with the others. The latest and fewest plants were produced with the perforated plastic and the cheesecloth covers. These data are consistent with observations made on plant growth during the course of the experiment.

TABLE 2
INFLUENCE OF TYPES OF PLANT BED COVERS ON THE PRODUCTION OF TOBACCO TRANSPLANTS (1971)

| Cover Designation | Transplants per Square Yard | | | |
|---|---|---|---|---|
| Experiment I | Early | Normal | Late | Total |
| Invention Cover SB-06 | 170 | 139 | 47 | 356 |
| Perforated Plastic | 57 | 142 | 78 | 277 |
| 28 × 24 Cheesecloth | 0 | 87 | 155 | 252 |
| Solid Plastic | 0 | 0 | 0 | 0 |
| Experiment II | Early | Normal | Late | Total |
| Invention Cover SB-06 | 65 | 136 | 107 | 308 |
| Perforated Plastic | 0 | 114 | 160 | 274 |
| 28 × 24 Cheesecloth | 0 | 0 | 110 | 110 |
| 24 × 20 Cheesecloth | 0 | 0 | 110 | 110 |
| Solid Plastic | 0 | 0 | 0 | 0 |
| Experiment III | Early | Normal | Late | Total |
| Invention Cover SB-06 | 148 | 329 | 86 | 563 |
| 24 × 20 Cheesecloth | 0 | 271 | 188 | 459 |
| 28 × 24 Cheesecloth | 0 | 301 | 157 | 458 |
| Solid plastic | 0 | 0 | 0 | 0 |

The invention seed or plant bed cover SB-06 is spun bonded polyhexamethylene adipamide nylon 6/6 continuous filaments which are disposed in random, intermingled relationship and overlap and intersect. They are bonded to each other at a multiplicity of irregularly spaced points along their lengths. The continuous filaments average 4-denier and the weight of the cover is about 0.6 ounces per square yard. Its thickness is about 5.1 mils. Its tensile strength (1 inch strip method Instron) is about 8.3 pounds (average) in the machine direction and about 3.9 pounds (average) in the cross direction. The grab tenacity (4 × 6 inch sample) is about 18 pounds in the machine direction and about 12 pounds in the cross direction. The tear strength values are about 2.4 pounds in the machine direction and about 2.3 pounds in the cross direction. The Mullen burst strength is in excess of about 20 pounds. All values are for dry samples, unless specifically indicated otherwise. The reinforcing strip is 1 inch wide and is 2 mil polyvinylchloride.

The results from this study are considered to be representative of those which would be obtained from further studies under similar conditions. Thus, they should be reliable indicators of the relative effects to be expected from the use of these covers under these experimental conditions.

The following conclusions appear to be supported by the data and field observations:

1. There was no practical differential effect between the two standard all cotton cheesecloth 28 × 24 and 24 × 20 covers on transplant production. 2. The SB-06 nonwoven reticulated filamentary invention cover was intermediate between the plastic covers and the 28 × 24 standard all cotton cheesecloth covers in its effects on air and soil temperature. The temperatures are moderate and are not too high or too low.

3. Under conditions of these experiments, the overall productive effect of the SB-06 nonwoven reticulated filamentary invention cover was substantially superior to the others studied.

4. Under conditions of more intensified management and manipulation of plastic covers than occurred in these experiments, it is probable that somewhat more early plants would have been produced under plastic than under the SB-06 nonwoven reticulated filamentary invention cover.

5. From considerations based on plant bed management and transplant production, the SB-06 nonwoven reticulated filamentary invention cover has the following distinct advantages over the other covers studied:

5.1 Less adherence to soil surface than cheesecloth covers following rain or irrigation.

5.2 Less deterioration than cheesecloth covers when in contact with soil surface.

5.3 Permits penetration of water, thus avoiding the requirement that the cover be removed to irrigate or apply pesticides, as is necessary for plastic covers.

5.4 Provides warmer temperature than cheesecloth covers, thus enabling higher rate of germination of seed and more uniform stand of seedlings. 5.5 Produces earlier and more transplants than cheesecloth covers.

5.6 Avoids the build-up of high temperatures which may reach the lethal or near lethal point under solid plastic covers.

5.7 Easier to stabilize than plastic covers, thus avoiding plant damage by whipping motion of plastic covers during periods of moderate to high winds or loss of the plastic covers by high winds.

5.8 Easier to manage and with fewer risk factors than plastic covers.

5.9 The SB-06 invention cover stretched when wetted with rain or aqueous media but contracted satisfactorily when dried. An excellent tenting effect was noted, as follows:

When the SB-06 invention cover is first placed over the seed and plant bed area to be protected, some of them are drawn relatively taut by pegs or wire fastening pins inserted through openings in the edge portions. In such configuration, the cover is stretched relatively taut over the ground but is basically out of intimate contact with the ground. This configuration shades and protects the seed or plant bed and permits excellent air passage and ventilation to the seeds and plants.

Subsequently, when it rains, the SB-06 invention cover, due to its unique construction, as described herein, stretches when it becomes wet and comes to rest in intimate contact with ground and satisfactorily prevents the washout and erosion of seed, plants and soil. Later, when the rain ceases, and the SB-06 cover dries out, in contracts and recovers its original size and shape and again becomes stretched relatively taut over the ground, out of intimate contact therewith. It is to be noted that, during such retraction of the SB-06 cover, it rises slowly and gently in the so-called "tenting" effect, and does not pull any seed, plants, or soil with it, because it has little adherence thereto.

This to be contrasted to the other seed or plant covers which remain in intimate contact with the ground after a rain, thus requiring the laborious expediture of considerable management time and effort to manually lift these other covers from the ground to restore them to their prior covering configurations which existed before the rain.

EXAMPLE II

The procedures disclosed previously are repeated substantially as set forth except that the nonwoven reticulated filamentary nonwoven fabric cover weighs only 0.3 ounces per square yard. This reinforcing edge strips add to its strength and it performs acceptably. The "tenting" effect which takes place after a rain is excellent. The results are generally comparable.

EXAMPLE III

The procedures disclosed previously are repeated substantially as set forth but using polyethylene terephthalate polyester filament seed and plant bed covers instead of the polyhexamethylene adipamide nylon 6/6 filament seed and plant bed covers. The results are generally comparable and the polyethylene terephthalate polyester filament seed and plant bed covers are considered superior to the standard and experimental cheesecloth and plastic covers.

EXAMPLE IV

The procedures of Example I are followed substantially as set forth therein with the exception that the continuous filaments are polyacrylic filaments continuing at least 85 percent by weight of acrylonitrile units. The results are generally comparable.

EXAMPLES V and VI

The procedures of Example I are followed substantially as set forth therein with the exception that the polyvinylchloride reinforcing strip is replaced by (a) polypropylene and (b) polyvinylacetate. The results are generally comparable. Heat sealing is accomplished by an ultrasonic sewing machine.

Although several specific examples of the inventive concept has been described, the same should not be construed as limited thereby nor to the specific features mentioned therein but to include various other equivalent features as set forth in claims appended hereto. It is understood that any suitable changes, modifications and variations may be made without departing from the spirit and scope of the invention.

What is claimed is:

1. A lightweight, highly porous and pervious and highly flexible, substantially rectangular spun-bonded covering for a seed or plant bed comprising: a flat substantially planar highly porous and pervious and highly flexible spun-bonded body portion formed of a nonwoven reticulated filamentary structure of overlapping, intersecting continuous synthetic organic thermoplastic filaments highly and randomly curled and intermingled and autogenously bonded to each other at a multiplicity of irregularly spaced points along their lengths wherever they overlap and intersect, said continuous filaments being disposed in random, intermingled configurations uniformly distributed throughout said structure without a pattern of parallelism between said continuous filaments so that no two parts of the structure are identical, said spun-bonded body portion weighing from about 0.3 ounce per square yard to about 6 ounces per square yard and comprising continuous filaments having an average denier of from about one-half denier to about 10 denier; reinforcing edge portions on both sides and both ends of said covering; reinforcing strips of synthetic thermoplastic materials positioned within said reinforcing edge portions; a plurality of openings formed at space intervals in said reinforcing edge portions; metallic or plastic grommets in said openings; and fastening devices extending through said openings into the ground whereby said covering may be secured in place stretched in a relatively taut condition over said seed or plant bed during normal use and basically out of intimate contact with said seed or plant bed during such normal use thus permitting excellent air passage and ventilation to the seeds and plants but being capable of stretching when wetted such as by rain to come into intimate contact with said seed or plant bed to prevent washout and erosion of seed, plants and soil and, subsequently, upon drying out, being capable of contracting and recovering its original stretched relatively taut condition out of intimate contact with said seed or plant bed, thus again permitting excellent air passage and ventilation to the seeds and plants.

2. A covering for a seed or plant as defined in claim 1, wherein the continuous synthetic organic thermoplastic filaments are nylon polyhexamethylene adipamide filaments.

3. A covering for a seed or plant bed as defined in claim 1, wherein the continuous synthetic organic thermoplastic filaments are polyethylene terephthalate polyester filaments.

4. A covering for a seed or plant bed as defined in claim 1 wherein the continuous synthetic organic thermoplastic filament are polyacrylic filaments.

5. A covering for a seed or plant bed as defined in claim 1 wherein the continuous synthetic organic thermoplastic filaments are polyolefinic filaments.

6. A covering for a seed or plant bed as defined in claim 1 wherein the continuous synthetic organic thermoplastic filaments are polypropylene filaments.

7. A covering for a seed or plant bed as defined in claim 1 wherein the continuous synthetic organic thermoplastic filaments are polyethylene filaments.

8. A covering for a seed or plant bed as defined in claim 1 wherein the continuous synthetic organic thermoplastic filaments are nylon 6 polycaprolactam filaments.

9. A covering for a seed or plant bed covering as defined in claim 1 wherein the synthetic organic thermoplastic reinforcing strip is polyvinylchloride.

10. A covering for a seed or plant bed covering as defined in claim 1 wherein the synthetic organic thermoplastic reinforcing strip is polypropylene.

11. A covering for a seed or plant bed covering as defined in claim 1 wherein the synthetic organic thermoplastic reinforcing strip is polyvinylacetate.

* * * * *